H. RIECK.
WOODWORKING MACHINE.
APPLICATION FILED JUNE 24, 1909.
972,249.
Patented Oct. 11, 1910.
3 SHEETS—SHEET 1.
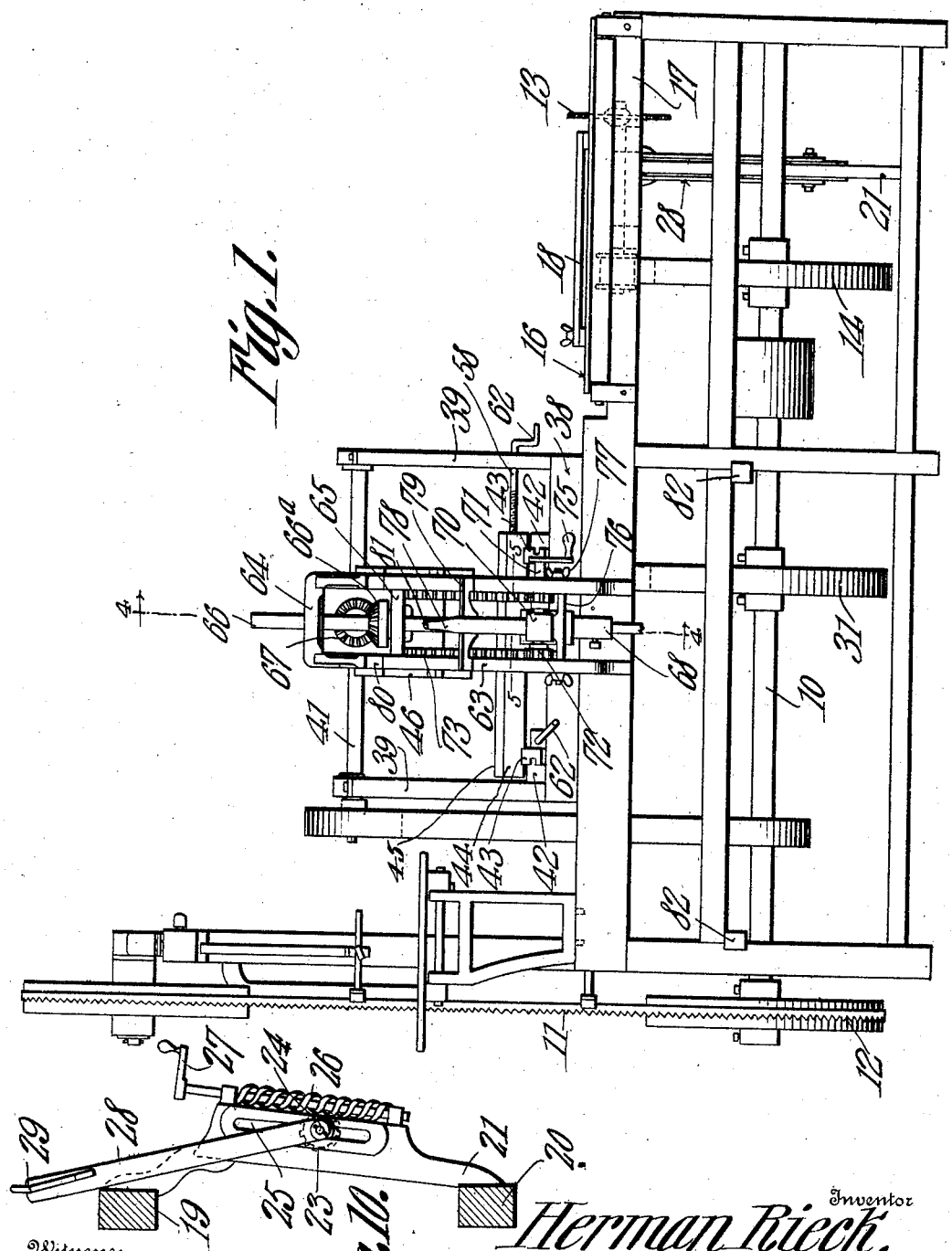
Witnesses
Inventor
Herman Rieck.
By C. A. Snow & Co.
Attorneys

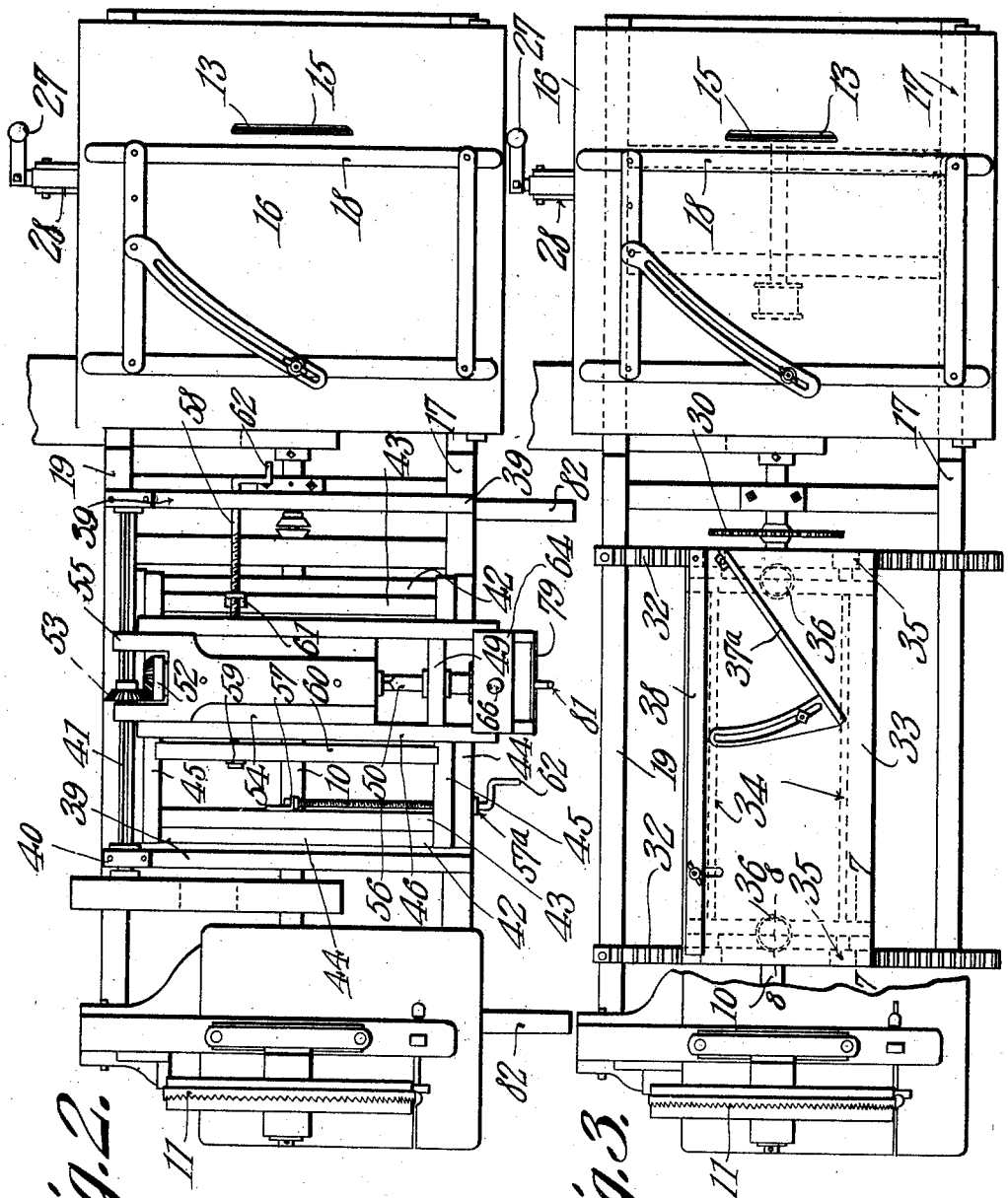

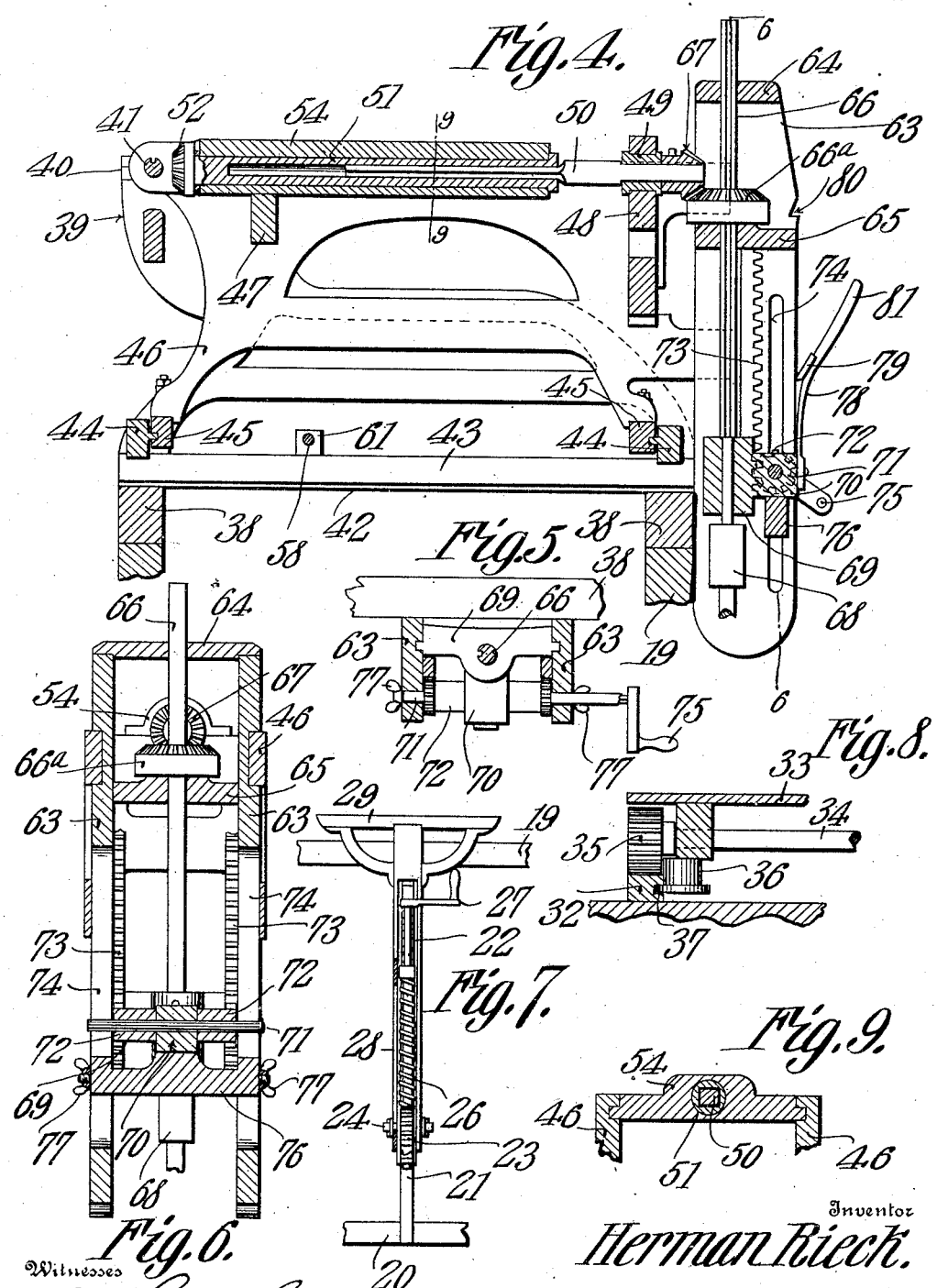

UNITED STATES PATENT OFFICE.

HERMAN RIECK, OF GREENWOOD TOWNSHIP, VERNON COUNTY, WISCONSIN.

WOODWORKING-MACHINE.

972,249.  Specification of Letters Patent.  Patented Oct. 11, 1910.

Application filed June 24, 1909.  Serial No. 504,120.

*To all whom it may concern:*

Be it known that I, HERMAN RIECK, a citizen of the United States, residing at township of Greenwood, in the county of Vernon and State of Wisconsin, have invented a new and useful Woodworking-Machine, of which the following is a specification.

This invention relates to that class of wood working machines in which several mechanisms are combined in one machine and driven by the same power, and more particularly a combined boring and sawing mechanism.

The invention relates specifically to the boring mechanism, its object being to provide improved means for adjusting the boring mechanism to the work, and also to increase the efficiency of the mechanism, and to provide certain novel and improved structural details to be hereinafter described and claimed.

The invention is illustrated in the accompanying drawings in which—

Figure 1 is a front elevation showing the boring mechanism in operative position. Fig. 2 is a plan view. Fig. 3 is a plan view of the machine with the boring mechanism removed. Fig. 4 is an enlarged transverse sectional view on the line 4—4 of Fig. 1. Fig. 5 is an enlarged horizontal sectional view on the line 5—5 of Fig. 1. Fig. 6 is a vertical section on the line 6—6 of Fig. 4. Fig. 7 is a detail of the saw table adjustment. Fig. 8 is a section on the line 8—8 of Fig. 3. Fig. 9 is a section on the line 9—9 of Fig. 4. Fig. 10 is an elevation of the device for raising and lowering the saw table to be hereinafter described.

Referring to the drawings, the supporting frame of the machine is composed of longitudinal side bars, and transverse end and intermediate bars, all of which are suitably connected, and arranged to support the mechanism. The main drive shaft 10 of the machine is mounted in suitable bearings on the lower cross-bars of the frame. At one end of the supporting frame is mounted a band saw 11 driven from a pulley 12 on the shaft 10, and at the opposite end of the frame is mounted a circular saw 13 driven from a pulley 14 on the shaft 10. The last mentioned saw projects through a slot 15 in a saw table 16 comprising a leaf which is pivoted at one of its ends to one of the top longitudinal bars 17 of the supporting frame. On the saw table is mounted an adjustable saw gage 18.

To the top and bottom longitudinal bars 19 and 20 of the supporting frame, adjacent to the free edge of the saw table, is secured a bracket 21 having a vertical recess in its outer edge, the inner wall of which recess is formed into a rack 22. In this recess is mounted a pinion 23 which meshes with the rack 22, and has its shaft 24 projecting through alined vertical slots 25 made in the side walls of the recess. On the outer edge of the bracket 21 are bearings in which an endless screw 26 is rotatably mounted, said screw being in mesh with the pinion 23. The screw is fitted with a handle 27 whereby it may be rotated, and when so rotated, the pinion 23 is rotated and caused to travel up and down on the rack 22. The pinion shaft 24 carries an arm 28 which is forked to straddle the bracket 21, and receive the respective ends of the pinion shaft. The upper end of the arm carries a cross-piece 29 which is engageable with the under side of the saw table 16 adjacent to its free edge. Upon operating the worm gearing herein described, the arm is moved upwardly or downwardly, whereby the table is raised or lowered at its free end.

Intermediate the saws 11 and 13, the supporting frame carries a second circular saw 30 which is driven from a pulley 31 on the shaft 10. Located to one side of this saw, and supported on the top longitudinal bars 17 and 19 of the supporting frame, are racks 32 on which a saw carriage 33 runs. The racks extend transversely of the machine. On the bottom of the carriage is mounted a pair of transverse shafts 34 carrying pinions 35 which are in mesh respectively with the racks 32. On the bottom of the carriage are also mounted flanged rollers 36 the flanges of which enter grooves 37 made in the inner edges of the racks. The carriage 33 is fitted with adjustable saw gages 37$^a$. The racks 32 are removably secured to the bars 17 and 19 in order that they may be taken off when the boring mechanism is to be used.

The boring mechanism is carried by a frame having sills 38 adapted to be bolted to the top bars 17 and 19 after the racks 32 have been removed, whereby said boring mechanism is mounted in proper position for use. The sills are connected at their ends by a suitable framework 39 having bearings 40 for a countershaft 41 extending parallel to the shaft 10 and belted thereto.

On the sills 38 are mounted stationary guide rails 42 which extend transversely of the machine, and on which are mounted for travel the slides 43 of a carriage which supports the spindle of the boring bit, and its associated parts to be presently described. The inner faces of the rails 42 have tongues which enter grooves in the contiguous faces of the slides 43. On the slides 43 are supported guide rails 44 extending at right angles thereto, and lengthwise of the machine, said rails being fixed to the slides 43. On the rails 44 are mounted for travel slides 45, the contiguous faces of said parts being provided with tongues and grooves in the same manner as the rails and slides 42 and 43.

From the slides 45 rise the side frame members 46 of the boring machine carriage, said frame members being connected at their ends by the cross-pieces 47 and 48 respectively. The cross-piece 48 carries a bearing 49 in which is mounted a shaft 50, said shaft being one of the members of a sectional shaft, the other member of which is indicated at 51. The shaft section 50 is angular in cross-section for a portion of its length, and telescopes within the shaft section 51, the latter being tubular, its bore corresponding to the cross-sectional shape of the shaft section 50, so that both sections will rotate together. The shaft sections 50 and 51 extend transversely of the machine, and on the section 51 is a bevel gear 52 which meshes with the bevel gear 53 on the shaft 41. The shaft section 51 is supported in an elongated bearing 54 fitting loosely between the frame members 46, so that the latter may be free to travel back and forth across the supporting frame of the machine. The bearing 54 has at one of its ends spaced ears 55 provided with alined openings through which the shaft 41 extends, the gears 52 and 53 being located between these ears. The longitudinal edges of the bearing 54 have tongues which fit within guide grooves in the inner faces of the frame members 46. The bevel gear 53 is splined on the shaft 41 so that it may move lengthwise thereon with the boring machine carriage. At 56 is indicated a screw for adjusting the boring machine carriage transversely. This screw is rotatably supported at one end in a bearing bracket at 57 secured to one of the slides 43. On one of the sills 38 is rigidly mounted a nut 57$^a$ through which this screw is threaded. A screw 58 for adjusting the carriage lengthwise is also provided. This screw is rotatably mounted at one of its ends in a bearing 59 carried by a cross bar 60 carried by the slide 45, and it is threaded through a nut 61 rigidly secured to one of the slides 43. Both screws are provided with suitable crank handles 62 for operating the same. The screw 56 extends transversely of the boring machine carriage, and the screw 58 extends longitudinally thereof, in view of which it will be evident that when the former is operated, the carriage will be adjusted transversely, and when the latter is operated it will be adjusted lengthwise of the frame of the machine.

On the front end of the boring machine carriage is mounted a pair of spaced vertically disposed plates 63 connected at the top by a cross-piece 64, and adjacent thereto by a cross-piece 65. These two cross-pieces have alined openings in which the spindle 66 of the boring bit is mounted. The spindle is vertically disposed, and is geared to the shaft section 50 by a bevel gear 66$^a$ on the spindle meshing with a bevel gear 67 on the shaft section. The gear 66$^a$ is supported on top of the cross-piece 65, and is splined on the spindle so that the latter may be lowered and raised to feed and back the boring bit. The spindle carries a chuck 68 for attachment of the boring bit, and adjacent to the chuck, it carries a cross-head 69, mounted to slide in guide grooves made in the inner faces of the plates 63. This cross-head is formed with a bearing box 70 which carries a shaft 71 on which are mounted pinions 72 which mesh with racks 73 secured to or formed integral with the inner faces of the plates 63. Adjacent the racks, and extending parallel thereto, the plates 63 have slots 74 in which the projecting ends of the shaft 71 work, one of said ends of the shaft being fitted with a crank handle 75, rotation of which, by reason of the engagement of the pinion 72 with the racks 73 lowers or raises the cross-head 69, and thus advances the boring bit into the work, or backs it. The cross-head is held on the spindle between a shoulder thereon and the chuck, as shown in Fig. 6.

In the slot 74 is mounted a cross-bar 76 which is in the path of the bearing box 70, in the downward movement thereof, and therefore serves as a stop for the bit, and thus regulates the depth of the hole to be bored. The cross-bar is adjustably mounted in the slot, and has at its ends reduced screw-threaded portions to receive wing nuts 77 whereby it is clamped in adjusted position.

To the bearing box 70 is fastened a resilient strip 78 having at its free end a pair of oppositely presented arms 79 engageable with notches 80 in the front edges of the bars 63, for holding the bit in elevated position while the work is being adjusted. The strip is provided with a handle 81 for operating it. The work to be bored is supported on brackets 82 mounted on the front of the supporting frame of the machine.

By the construction and arrangement of parts herein described, the machine can be quickly changed from a sawing to a boring machine, and the boring mechanism is given a wide range of adjustment, the means whereby the adjustments are effected, being simple in construction, and easily controlled by the operator.

What is claimed is:

1. In a boring machine, a supporting frame, spaced plates thereon, said plates having alined slots, a cross-head slidable between the plates, a boring spindle carried by the cross-head, a cross-bar adjustably mounted in the slots in the path of the cross-head, for limiting the movement thereof in one direction, said cross-bar projecting at its ends from the slots, and being reduced and screw threaded, nuts screwed on said threaded ends for holding the cross bar at adjustment, means for operating the cross-head, and driving means for the spindle.

2. In a boring machine, a supporting frame, a carriage mounted for travel thereon transversely and longitudinally, a boring spindle on the carriage, a longitudinal shaft mounted on the supporting frame, a sectional shaft on the carriage geared to the spindle and to the drive shaft, and extending transversely of the latter shaft, one of the shaft sections being tubular and receiving the other section, and a bearing for the tubular shaft section in sliding engagement with the carriage to permit the transverse travel thereof, said bearing being loosely supported at one end on the drive shaft to travel with the carriage on its longitudinal movement.

3. In a boring machine, a supporting frame, a carriage mounted for travel thereon transversely and longitudinally, said carriage having spaced frame members provided with guide grooves, a bit spindle on the carriage, a longitudinal drive shaft mounted on the supporting frame, a sectional shaft on the carriage geared to the spindle and the drive shaft, and extending transversely of the latter shaft, one of the shaft sections being tubular and receiving the other section, and a bearing for the tubular shaft section in sliding engagement with the carriage to permit the transverse travel of the latter, said bearing being loosely supported at one end on the drive shaft to travel with the carriage on its longitudinal movement, and said bearing having tongues at its longitudinal edges which enter the guide grooves of the aforesaid frame members.

In testimony that I claim the foregoing as my own, I have hereto affixed my signature in the presence of two witnesses.

HERMAN RIECK.

Witnesses:
C. E. WOLFENDEN,
E. G. LAWSHA.